May 13, 1930. A. C. SENGER 1,758,264
TIRE CHANGING MACHINE
Filed Oct. 10, 1927 2 Sheets-Sheet 1

INVENTOR.
Albert C. Senger
BY Maréchal and Noe
ATTORNEYS.

May 13, 1930.  A. C. SENGER  1,758,264
TIRE CHANGING MACHINE
Filed Oct. 10, 1927   2 Sheets-Sheet 2

INVENTOR.
Albert C. Senger
BY Maréchal and Noe
ATTORNEYS.

Patented May 13. 1930

1,758,264

UNITED STATES PATENT OFFICE

ALBERT C. SENGER, OF HAMILTON, OHIO

TIRE-CHANGING MACHINE

Application filed October 10, 1927. Serial No. 225,367.

This invention relates to a machine for facilitating the application or removal of a tire from a rim.

One of the principal objects of the invention is to provide a machine of this character which may be easily operated to effect the removal of a tire from a solid rim such as are used on wire or disc wheels of a automobile.

Another object of the invention is to provide a tire-changing machine which is adapted to handle rims and tires of different kinds and sizes.

Other objects of the invention will be apparent from the following description and from the accompanying drawings, in which Fig. 1 is a perspective view of the machine embodying the present invention;

Figure 1:
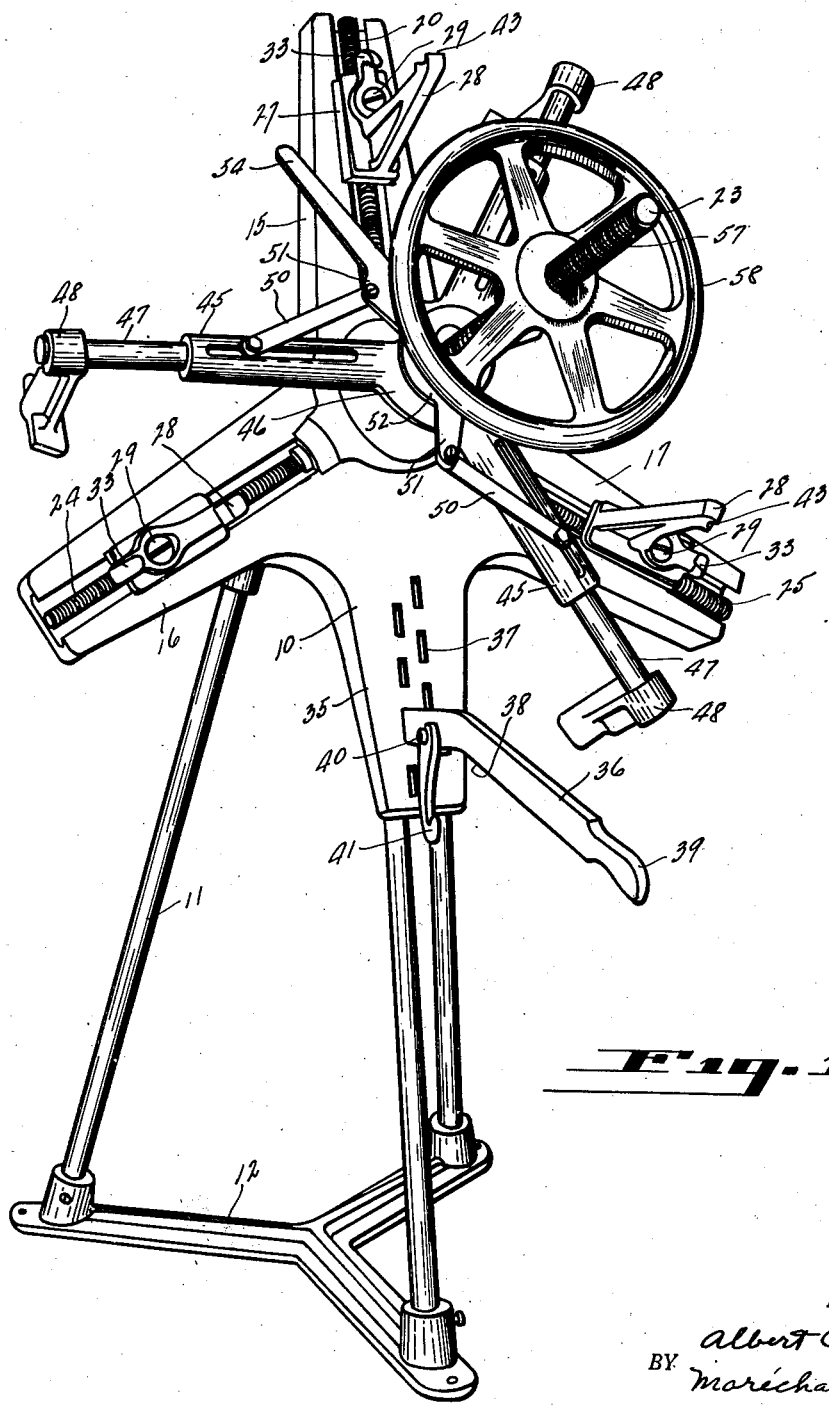

Referring more particularly to the drawings the numeral 10 designates generally a support adapted to receive a rim of a vehicle wheel. The support is mounted in fixed position upon the standard 11 which is shown as comprising three upwardly extending pipes the lower ends of which are fixed to a base plate 12. This standard is connected at its upper end to the rear portion 13 of the support 10, so that the support is inclined at the rather steep angle of about 70° to the horizontal. As shown in Fig. 1 the support 10 embodies a plurality of radially extending arms 15, 16 and 17 which are preferably spaced 120° apart, the arm 15 preferably extending upwardly while the two arms 16 and 17 extend downwardly therefrom at an angle as shown.

Within the arm 15 is a threaded operating shaft 20 suitably held against endwise movement in the support by means of collars and antifriction bearings, and adapted to be rotated in the arm. The inner end of the arm 20 is rigid with a bevel gear 21 which engages a bevel gear 22 fixed adjacent the inner end of a shaft 23 which is mounted for rotational movements in the support 10, suitable collars being provided on this shaft to prevent any endwise movement thereof. Each of the arms 16 and 17 is also provided with a rotatable threaded shaft, 24 and 25 respectively, upon the inner ends of which are beveled gears also engaging with the gear 22 in the manner set forth in my prior Patent No. 1,677,052, July 10,1928, entitled "Tire changing apparatus," upon which the present invention is an improvement. As shown in the accompanying drawing and in the disclosure set forth in my prior patent referred to, each of the operating shafts 20, 24 and 25 is threaded in a slidable nut member 27 to cause radial movements of the nut members as the operating shafts are rotated. Each nut member is pivoted to a rim-engaging member 28 which is freely movable about the retaining screw or bolt 29 which is threaded in the nut member. It will be understood that the rim-engaging members 28 are thus moved simultaneously in a radial direction towards or away from the center as the shaft 23 is rotated, and a tire rim 32 may thus be engaged by the members 28 so that the rim is located concentrically with the axis of the shaft 23. Where the rim 32 is split transversely the hub-shaped lugs 33 on the members 28 are engageable with one side of the rim so that the rim may be contracted as the members 28 are moved toward the center of the shaft 23 by rotational movement of the latter. The slit rim may be expanded by outward movements of these members 28 which are then engaged with the inside of the rim in a manner which will be readily apparent.

Figure 3:
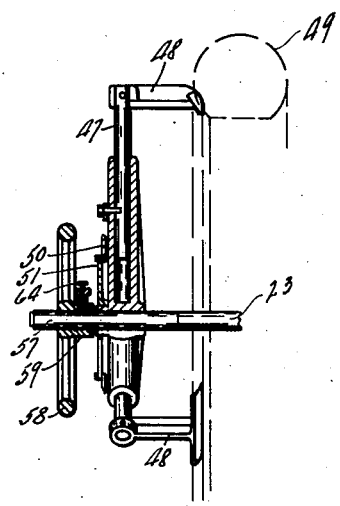
Fig. 3 is a vertical section through the tire remover assembly.
Figure 2:
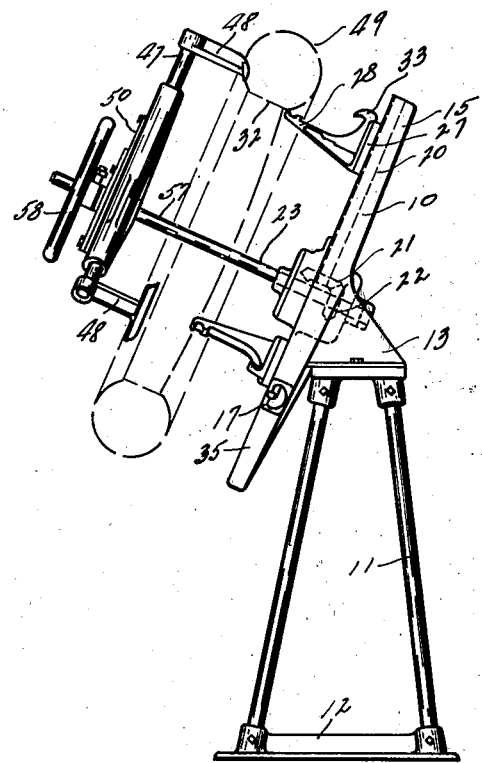
Fig. 2 is a side elevation of the tire-changing machine.
Figure 4:
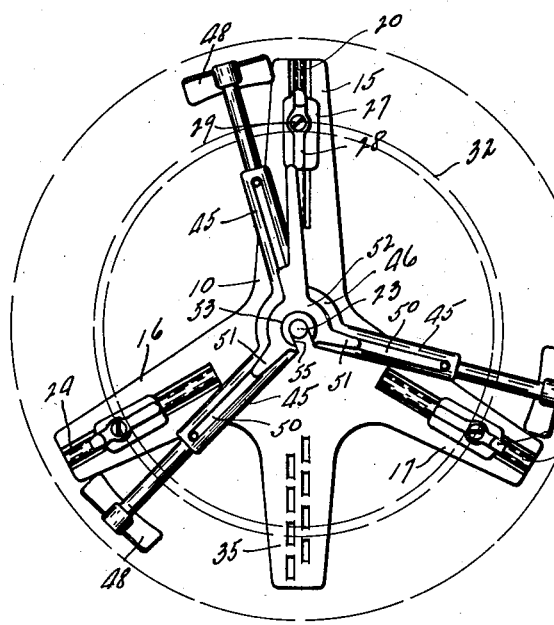
Fig. 4 is a view of the machine in the direction of the axis of the rim with the hand-wheel removed.
Figure 5:
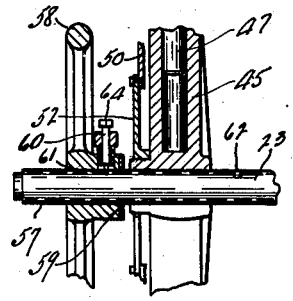
Fig. 5 is an enlarged central section through the end of the shaft, showing a portion of the tire remover mounted thereon.

Before contracting a split rim the split ends of the latter are moved out of alignment with one another. For this purpose the support 10 has a downwardly extending arm 35 which is provided with a series of provisions such as slots 37 adapted to receive the end of a manually operable lever 36 so that the latter may extend out transversely of the rim adjacent the split portion thereof. As shown, the end of the lever 36 is adapted to be inserted in the series of slots 37 provided in the arm 35 and a suitable slot is available for any size rim which is to be handled, so that the lever 36 may extend closely adjacent one split end of the rim with the portion 38 of the lever engaging the inner surface of the rim. The lever 36 has a handle 39 which may be pressed downwardly to bring the ends of the rim into alignment with one another. Pivotally connected to an inner portion of the lever 36 as by means of the bolt 40 is a hook 41 which is adapted to engage a peripheral portion of the rim adjacent a split end and the handle 39 may then be pulled upwardly to move the split ends of the rim out of alignment with one another so that the rim may be contracted. It will be understood that the fulcrumed end of the lever 36 is slightly smaller than the vertical extent of the slot 37 and vertical movements of the lever are readily permitted while the end of the lever is retained operably fulcrumed in the support.

Where a tire is to be removed from a solid rim or one which is not split transversely considerable difficulty is often encountered in pressing the tire off of the rim due to the fact that the rim becomes rusty and the tire is thus rather firmly held on the rim and strongly resists efforts to moving it in the direction of the axis of the rim. These solid rims are usually provided with one side which may be removed so that the tire may be pressed off of the rim in the direction of this side. As shown in Fig. 2 such a rim is adapted to be held by means of the fingers 43 on the rim-engaging members 28. These fingers 43 are adapted to be moved into engagement with the side of the rim after the removable section has been displaced from the rim, in such a way that the fingers will not interfere with the removal of the tire, these fingers being located out at the ends of the members 28 as shown. After the rim-engaging members 28 have been adjusted to firmly hold a solid rim in the position shown in Fig. 2 use is made of the tire remover shown in Fig. 3 to press the tire off of the rim.

This tire remover embodies a plurality of arms 45 extending radially from the central plate 46, the arms as shown being three in number and extending 120° apart so that they are evenly positioned about the center of the plate. The arms 45 are hollow and slidable within each arm is a rod 47 at the outer end of which is a tire-engaging foot 48, these feet extending in the direction parallel to the axis 23 towards the tire 49. The rods 47 are adapted to be moved simultaneously outwardly and inwardly so that the feet 48 are adjustable radially to positions where they may engage the tire adjacent the rim. For this purpose each rod 47 is pivotally connected to a link 50, the arms 45 being slotted for this purpose. The other ends of these links are pivoted to projections 51 extending outwardly from an operating plate 52 which is also provided with a lever arm 54 by which it may be manually adjusted about the axis of the shaft 23, the plate 52 being mounted for rotational movements on a boss 53 on the plate 46. The plate 46 is provided with a slot 55 the inner end of which is semi-circularly formed and corresponds in diameter with the diameter of the shaft 23. The operating plate 52 is also correspondingly slotted at one side, the slots in the plates 46 and 52 being in registration when the handle 54 has been moved to such a position as to fully extend the arms 47 as far as they will go. The two plates assembled together may thus be moved down over the shaft 23 in a direction transversely of the axis of this shaft and the assembly will then be pivotally supported concentrically on the shaft and freely movable along the shaft in the direction of its axis. The outer end of the shaft 23 is provided with screw threads 57 which are received by corresponding threads provided in the hub of a hand-wheel 58, and the hand-wheel 58 may thus be rotated to effect its axial movement along the shaft. A collar 59 is provided on the inner side of the hub of the hand-wheel and this collar presses against the end surface of the boss 53 when the hand-wheel 58 is moved inwardly along the shaft by its rotational movements.

As the cylindrically formed slot in the plate 46 of the tire remover is smooth and unthreaded the pressure exerted by the rotating hand-wheel, with the shaft 23 stationary, causes the tire remover to be moved bodily along the shaft, and the feet 48 being in engagement with the outer side of the tire causes the tire to be pressed off of the rim, this operation taking place in a very convenient manner and without the exercise of great physical effort, since considerable pressure may be exerted on the tire remover by the exertion of slight force causing rotation of the hand-wheel.

After the tire has been removed from the rim the tire remover assembly may be very easily and quickly removed from the shaft 23 by merely operating the handle 54 to move all of the rods 47 outwardly as far as they will go. The slots in the plates 52 and 46 will then register with one another and the tire remover assembly can then be lifted bodily without necessitating the removal of the hand-wheel from the threaded shaft 23.

This hand-wheel 58 by which the pressure is exerted on the tire remover assembly is also utilized for effecting the rotation of the shaft 23 when the latter is to be operated for adjusting the rim-engaging members 28 radially or when expanding or contracting the rim. As previously stated the hub of the handle 58 is threaded on the shaft 23, but the hand-wheel may, when desired, be engaged with the shaft, and for this purpose the hub of the hand-wheel is provided with a spring-pressed plunger 60 which is normally pressed inwardly by a comparatively light spring and it rides on top of the threads 57 when the hand-wheel is being rotated to cause endwise movement of the tire remover assembly. The shaft 23 is provided with one or more sockets 61 and 62, these sockets extending inwardly toward the center of the shaft and being only slightly larger than the diameter of the spring-pressed plunger 60. When the hand-wheel 58 has been moved to such a position along the shaft 23 that the plunger 60 is brought into engagement with one or the other of the sockets 61 or 62 the spring-pressed plunger is forced into this socket and the further rotational movements of the hand-wheel are then effective in causing the rotation of the shaft 23 in either direction as desired. If it is intended that the shaft 23 is to be maintained stationary the plunger 60 may be held out and prevented from engagement with the socket and for this purpose the plunger 60 is provided with a head 64 which is readily accessible to the operator so that he may hold the plunger out of engagement until the hand-wheel has been rotated a fractional part of a turn after which the plunger will continue to ride on the outer portions of the threads 57 on the shaft. A plurality of sockets are preferably provided in the shaft 23 so that the hand-wheel may be located in engagement therewith at a number of points along the shaft, to avoid the necessity for turning the hand-wheel a greater distance before registration can be effected by the spring-pressed plunger with one of the sockets in the shaft.

When the machine is intended to be used for handling split rims the tire remover may be used for forcing the tire off of the rim if desired. However, it is usually unnecessary to employ any means for accomplishing this function and it will usually be sufficient to operate the machine without employing the use of the tire remover assembly when rims of this character are to be handled, and when such is the case the hand-wheel 58 is maintained fixed to the shaft 23 at a location along this shaft suitable for convenient handling and the rim-engaging members 28 may thus be operated as desired. Where the rim is not removable from the wheel as may sometimes be the case in wire wheels or disc wheels, these wheels may be readily mounted on the shaft 23 by first removing the hand-wheel from the end of the shaft, the tire remover assembly also having been removed. The outwardly extending rim-engaging members 28 and the inwardly extending feet 48 of the tire remover provides for sufficient space between these various members so that any size wheel may be mounted upon the shaft 23, and the convenient operation of the rim-engaging members and also of the tire engaging feet 48 is such as to permit the machines to be employed where practically any size tire and any kind of a rim or wheel is to be handled.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a tire changer, a support, means on said support adapted to be moved into engagement with a rim, and a tire remover movably mounted on said support and having radially adjustable members engageable with a side of the tire on said rim, a pivoted lever for quickly simultaneously moving said adjustable members equally toward a common center, and threaded means for moving said remover in the direction of the axis of the rim to press the tire off of the rim, said tire remover having provisions whereby it may quickly be removed from said support.

2. In a tire changer, a support having a plurality of radially extending arms, members carried by said arms for engaging a rim, a shaft rotatably mounted in said support and connected to said members to simultaneously adjust said members radially, a tire remover mounted on said shaft and embodying a plurality of radial arms engageable at their ends with the side of the tire, and operating means on said shaft, having provision for rotating said shaft or for moving the tire remover axially along the shaft.

3. In a tire changer, a support having a plurality of outwardly extending arms, a rotatable shaft mounted in said support, members adjustably mounted on said arms and operably connected to said shaft so as to be moved into engagement with the rim and hold the rim concentric with the shaft axis, a tire remover mounted on said shaft, and a hand-wheel threaded on said shaft and adapted to be rotated to cause the tire remover to be moved along the shaft to press the tire off of the rim, and means for operably connecting said hand-wheel to said shaft to cause the shaft to be rotated upon rotational movements of said hand-wheel.

4. In a tire changer, a support, means on said support adapted to receive transversely split rims of various diameters, means for expanding or contracting a rim, and a lever adjustably and removably fulcrumed in said support and extending generally parallel to the rim axis adjacent the split portion thereof for moving the ends of the rim into and out of alignment with one another, and means for pressing the tire off of the rim.

5. In a tire changer, a support, means on said support adapted to receive a transversely split rim, means for expanding or contracting said rim, and a lever for changing the alignment of the ends of the rim, said support having a series of sockets for receiving the end of the lever in a plurality of different positions adjacent the split portion of the rim so that the lever extends generally parallel to the rim axis.

6. In a tire changer, a support having a plurality of radial arms, means on said arms for receiving a transversely split rim, operating mechanism therefor to expand or contract the rim, said support having a series of provisions adjacent the split portion of the rim for removably receiving the end of a hand-lever, and a hand-lever having a pivoted hook and adapted to be operably connected with any of said provisions and operated to move the ends of the rim into or out of alignment with one another.

7. In a tire changer, a support having a series of radially extending arms, a standard fixed to said support to hold the same fixed at a steep angle inclined to the horizontal, a shaft extending out from said support and rotatably mounted therein, means operated by said shaft for receiving, expanding or contracting a rim concentrically with said shaft, and a hand-lever having one side adjustably fulcrumed in said support adjacent the split portion of the rim and extending out generally parallel to the rim axis adjacent the lower portion of the rim and adapted to be moved substantially vertically at its free end to change the alignment of the ends of the rim.

8. In a tire changer, a support for holding a rim and including an outwardly extending shaft concentric with said rim, a readily removable tire remover having a recessed portion so that it can be moved from a position alongside the said shaft and applied to said shaft in a direction transverse of the axis of the shaft, and means for moving said tire remover along said shaft to cause a tire to be pressed off of said rim.

9. In a tire changer, a support including an outwardly extending shaft, rim-engaging means on said support for holding a rim concentric with said shaft, a tire remover adapted to be moved over the shaft and applied thereto in a direction transverse of the axis of the shaft, radially adjustable members carried by said tire remover and adapted to engage the side of the tire on said rim, means rotatable about the axis of the shaft for simultaneously adjusting the position of said members, and means for sliding said tire remover along said shaft to press the tire off of the rim.

10. In a tire changer, a support including an outwardly extending rotatable shaft, rim-engaging means adjustably mounted on said support and operably connected to said shaft for holding a rim concentric with said shaft, a tire remover adapted to be moved over the shaft and applied thereto in a direction transverse of the axis of the shaft, radially adjustable members carried by said tire remover and adapted to engage the side of the tire on said rim at a plurality of points spaced about the tire, means rotatable about the axis of the shaft for simultaneously adjusting the position of said members, a hand-wheel threaded on said shaft, means for sliding said tire remover along said shaft to press the tire off of the rim, and means for connecting said hand-wheel to said shaft.

11. In a tire changer, in combination, a fixed support including three radial arms spaced 120° apart, a radially adjustable rim-engaging member mounted on each arm, a shaft extending out from said support, operable connections between said shaft and said rim-engaging members for simultaneously adjusting said members for engaging rims of various sizes, a hand-wheel threaded on said shaft and engageable therewith for rotating the same, a tire remover adapted to be applied to said shaft in a direction transverse of the shaft axis so as to be slid along the shaft by the hand-wheel, said tire remover having a hub plate and three radial arms spaced 120° apart, a tire engaging member on each arm, and means for sliding said tire-engaging members simultaneously to accommodate tires of different sizes, said means including a member rotatably mounted on said hub plate, and link connections between the said member and the tire-engaging members.

In testimony whereof I hereto affix my signature.

ALBERT C. SENGER.